July 7, 1931.  R. LUZARDO  1,812,968
HELICOPLANE
Filed April 26, 1928   6 Sheets-Sheet 1

Inventor
R. Luzardo
By Semmes & Semmes
Attorney

July 7, 1931. R. LUZARDO 1,812,968
HELICOPLANE
Filed April 26, 1928 6 Sheets-Sheet 4

Inventor
R. LUZARDO
By Semmes & Semmes
Attorney

July 7, 1931.  R. LUZARDO  1,812,968

HELICOPLANE

Filed April 26, 1928  6 Sheets-Sheet 5

Inventor
R. Luzardo

By Semmes & Semmes
Attorney

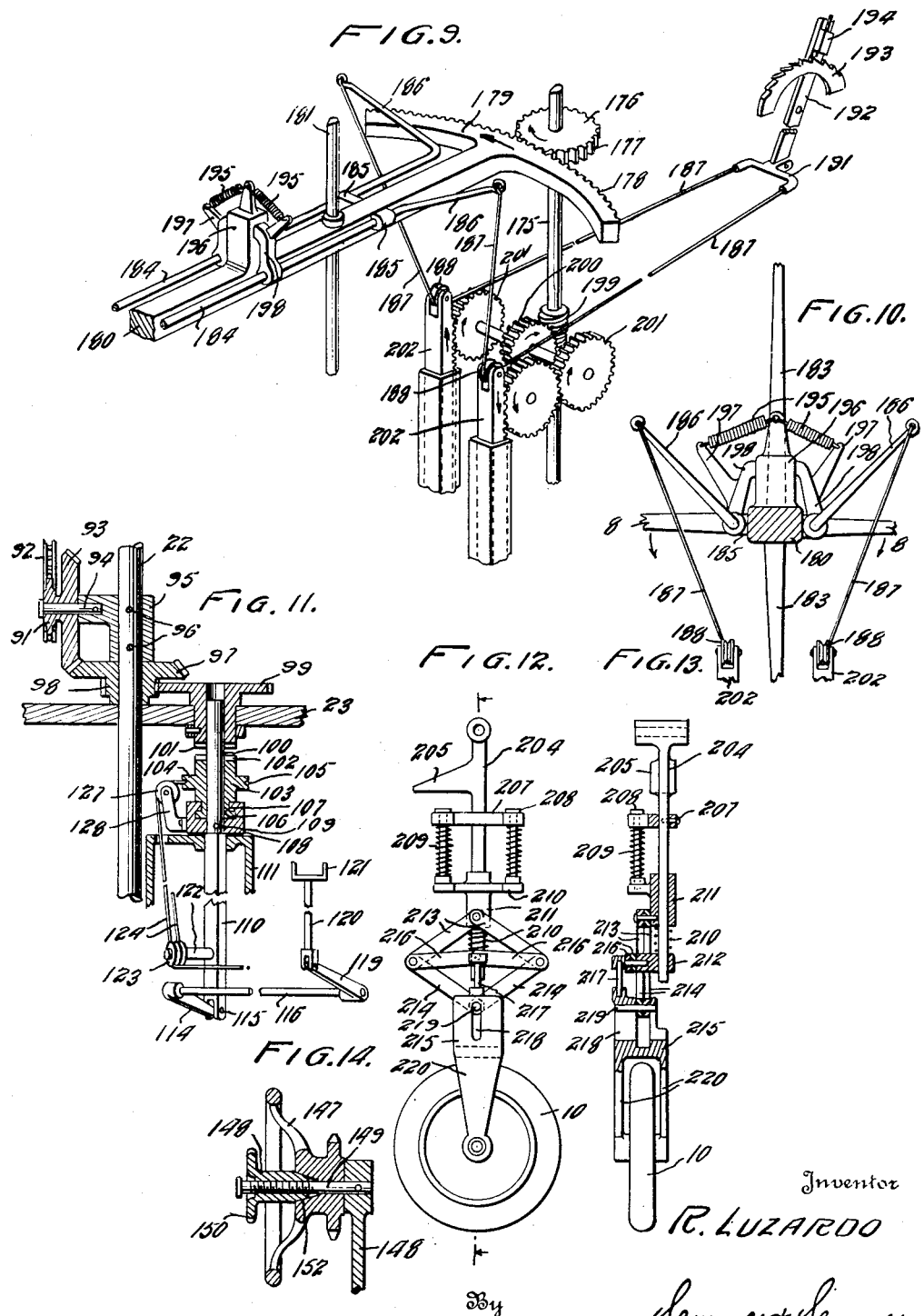

Patented July 7, 1931

1,812,968

UNITED STATES PATENT OFFICE

RUDOLPH LUZARDO, OF NEW YORK, N. Y.

HELICOPLANE

Application filed April 26, 1928. Serial No. 272,951.

This invention relates to heavier than air flying machines, and more particularly to that type of vertical ascension machines known as helicopters.

An object of this invention is to devise a combined airplane and helicopter which may be denoted as a helicoplane.

Another object of this invention is to devise a combined airplane and helicopter in which the same wing elements are utilized for both airplane and helicopter functions.

Another object of this invention is to provide a heavier than air flying machine adapted for both vertical and horizontal travel at the will of the operator.

Another object of this invention is to provide a helicoplane in which the power for both vertical and horizontal travel is derived from the same engine.

Another object of this invention is to provide a helicoplane that can be operated by a single aviator, and is simply and easily controlled in flight.

With these and other objects in view, which may be incident to my improvements, the invention consists in the parts and combinations to be hereinafter set forth and claimed, with the understanding that the several necessary elements comprising my invention may be varied in construction, proportion and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation have been made the subject of illustration.

In the drawings forming part of this specification Figure 1 is a front elevation of my improved helicoplane showing wings set for vertical rise.

Figure 9 is a perspective view of the tail operating device.

Figure 10 is a vertical section along the line 10—10 of Figure 9.

Figure 11 is a vertical longitudinal section of the upper wing adjusting clutch mechanism.

Figure 12 is a side elevation of a wheel mounting structure.

Figure 13 is an end elevation (partly in section) of same.

Figure 14 is a vertical section through one of the control hand wheels.

Figure 1:
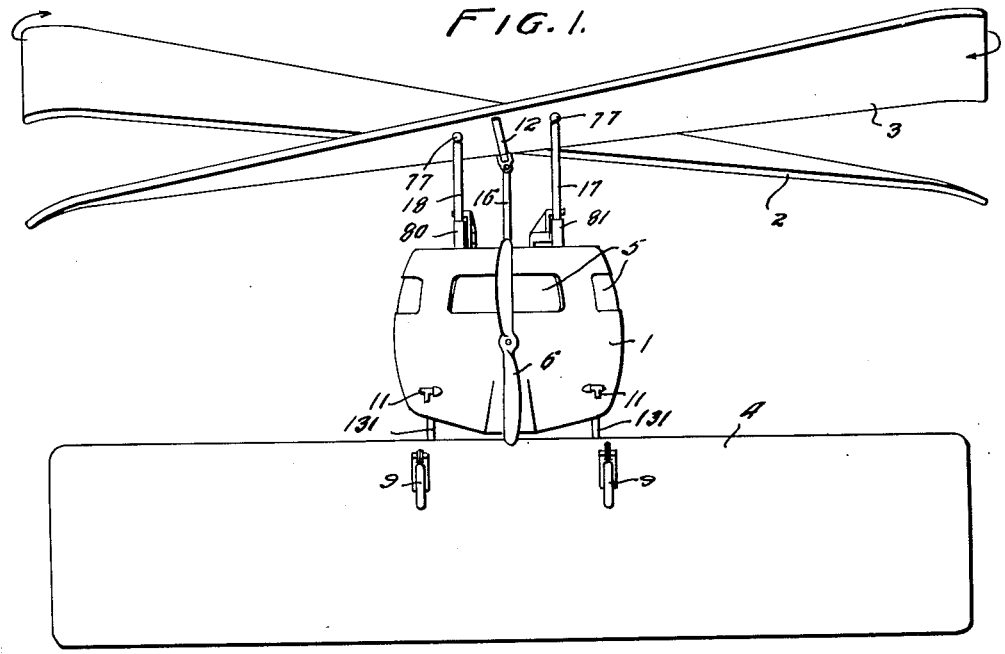

Referring by numerals to the drawings, 1 represents the body or fuselage of my improved helicoplane, which is made of a light metal such as aluminum and provided with upper wings 2 and 3 and a lower wing 4. The upper part of the body 1 is also provided with a plurality of windows 5, so arranged as to permit all around vision of the operator. At the front of the body is located the usual propeller 6, used for horizontal travel, and at the rear is provided a rudder 7 and horizontal tail planes 8.

For travel along the ground there are attached to the under side of the body two front wheels 9 and one rear wheel 10, all on identical resilient mounts 11. Upper wings 2 and 3, are triangular-shaped and are so arranged that when set for horizontal travel they form one continuous rectangular wing surface, as clearly shown in Figures 3 and 4. When arranged for vertical travel these wings can be set at an angle to each other, facing in opposite directions, so as to form a vertical lifting propeller. This is one of the principal novel features of my invention.

The wings 2 and 3, which are made of a framework of light wooden ribs covered with aluminum plates, are supported at their centerlines by metal straps 12 and 13 which are attached through toggle joints 14 and 15 to a common vertical steel shaft 16, so that both wings may be tilted up or down and sidewise at any desired angle to the vertical shaft 16.

Figure 7:
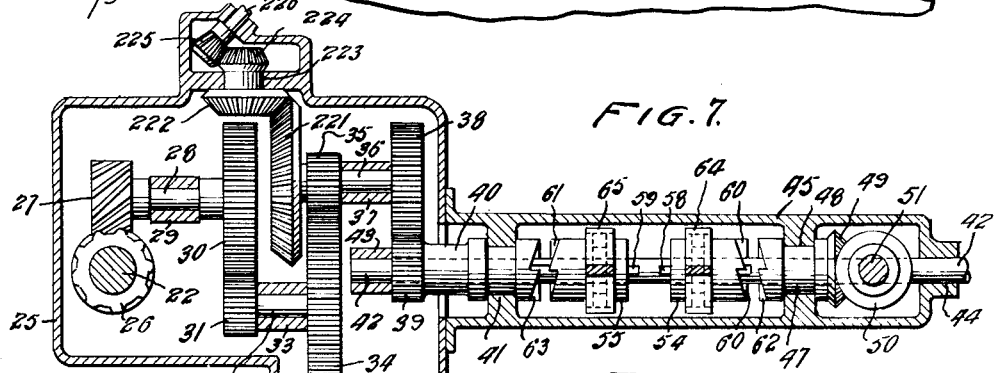
Figure 7 is a horizontal longitudinal section through the transmission gear box.
Figure 8:
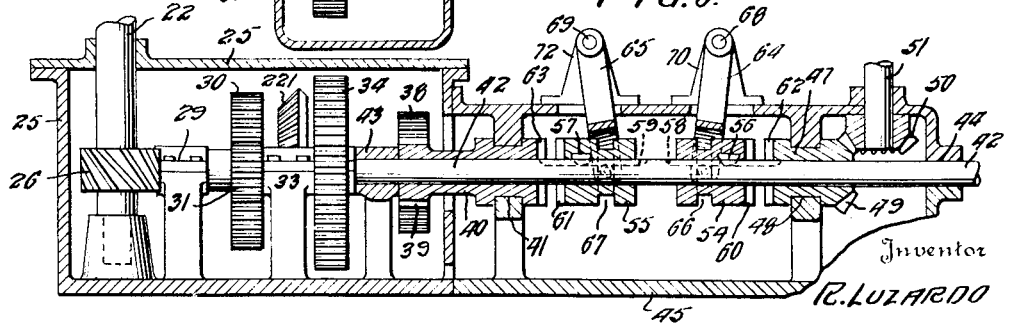
Figure 8 is a vertical transverse section of same.

The tilting of wings 2 and 3 is accomplished by a plurality of sector racks 17 and 18 attached to wing 3, and 19 and 20 attached to wing 2, the operating mechanism for which will be described hereinafter. Central shaft 16 is rigidly attached at its lower end in a strong steel cross frame 21 which is in turn rigidly secured to the top of a second vertical shaft 22 which is journalled in a cross strut 23 and terminates at its lower end in step bearing 24 of transmission gear box 25. (See Figures 7 and 8.) Rigidly mounted near the lower end of shaft 22 is a worm gear 26 which meshes with a worm 27 secured to the end of an intermediate drive shaft 28 journalled in a fixed bearing 29 and carrying on its other end a gear wheel 30. Meshing with gear wheel 30 is a pinion 31 secured to one end of an intermediate drive shaft 32 journalled in a fixed bearing 33 and carrying on its other end a gear wheel 34 which in turn meshes with a pinion 35 carried on one end of a third intermediate drive shaft 36, also journalled in a fixed bearing 37 and carrying on its other end a gear wheel 38. Meshing with gear wheel 38 is a pinion 39 integral with sleeve shaft 40, journalled in fixed bearing 41, and adapted to rotate on main drive shaft 42 which is journalled at its free end in a support bearing 43, and at its other end in a main bearing 44 integral with gear box 45, through which it extends and is connected to engine 46. Mounted on main drive shaft 42, intermediate its bearings 43 and 44 is a sleeve shaft 47 mounted in bearing 48, and having on one end an integral bevel gear 49 meshing with a companion bevel gear 50 attached to vertical drive shaft 51 which drives the horizontal propeller 6 through crown gears 52 and shaft 53. Slidably mounted upon main drive shaft 42 are duplicate ratchet clutches 54 and 55, which are caused to rotate with shaft 42 by splines 56 and 57 engaging in slots 58 and 59 in shaft 42. Clutches 54 and 55 each have on their outer faces ratchet teeth 60 and 61 which are adapted to engage similar teeth 62 and 63 on sleeve shafts 47 and 40 respectively. Bestriding ratchet clutches 54 and 55 are yoke members 64 and 65 which engage in circumferential grooves 66 and 67 in clutches 54 and 55 respectively. Yokes 64 and 65 are rigidly attached to horizontal shafts 68 and 69 journalled in bearings 70, 71 and 72, 73 respectively, and having secured at their other ends control levers 74 and 75 respectively, which are located at a convenient point adjacent the operator's seat 76. By pulling lever 74 to the rear, shaft 68 is rotated and moves yoke 64 in the opposite direction, which slides clutch 54 along main drive shaft 42 until its teeth 60 engage teeth 62 on sleeve shaft 47. With clutch 54 thus engaging sleeve shaft 47, power from engine 46 is transmitted through shaft 51, crown gears 52 and shaft 53 to propeller 6. By throwing lever 54 forward, propeller 6 is correspondingly disengaged from engine 46. In a similar manner pushing lever 75 forward causes clutch 55 to engage sleeve shaft 40 and power is thus transmitted from engine 46 through eduction gearing in box 25 to main vertical shaft 22 which in turn imparts rotation to cross frame 21, vertical shaft 16 and wings 2 and 3. A reverse movement of lever 75 disengages engine 46 from wings 2 and 3. With both clutches 54 and 55 engaged power is transmitted to both propeller 6 and wings 2 and 3, and with both clutches disengaged (in neutral as shown in Figure 8) power is shut off from propeller 6 and wings 2 and 3.

Figure 2:
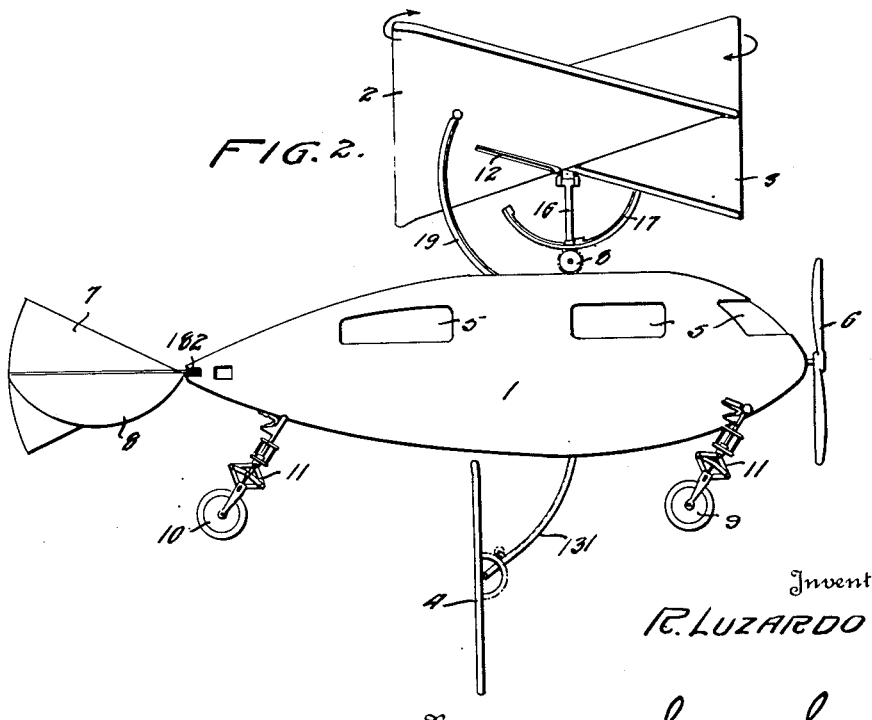
Figure 2 is a side elevation of the same.

In order to set the wings 2 and 3 for vertical ascension it is necessary to tilt them at an angle to each other along the diagonal median line which divides them, as shown in Figures 1 and 2. To accomplish this, each top wing 2 and 3 is provided with two sector racks 17, 18 and 19, 20, respectively which are attached to each wing with ball and socket joints 77 so that the wing may assume any angle with reference to its sector racks. Sector racks 17 and 18 are provided with external teeth 78 and 79 which engage with gear wheels 80 and 81 which in turn mesh with gear wheels 82 and 83 which also engage with teeth 84 and 85 on sector racks 19 and 20. (See Figures 3 and 4.) Gear wheel 82 is fixed on shaft 86 which is journaled in cross frame 21 and carries at its other end a fixed attached bevel gear wheel 87 which meshes with a bevel gear 88 which in turn is meshed with bevel gear wheel 89 rigidly attached to gear wheel 83.

Bevel gear 89 and gear wheel 83 turn freely on the end of shaft 86, in a direction opposite to that of gear 82 and bevel gear 87. Near its center shaft 86 carries a fixedly mounted sprocket wheel 90 which is rotated by a smaller sprocket 91 by means of an endless chain 92. Sprocket 91 is integral with a bevel gear 93 which turns on a fixed shaft 94 attached to a sleeve bracket 95 which in turn is fixedly secured to vertical shaft 22 by a plurality of cross pins 96 (see Figure 11).

Meshing with bevel gear 93 is a bevel gear 97 freely mounted on shaft 22, so that the normal rotation of shaft 22 in driving wings 2 and 3 does not rotate gear 97. Integral with bevel gear 97 is a smaller gear 98 which meshes with a larger gear 99, journalled in cross brace 23 and mounted to rotate freely on the upper end of a vertical shaft 100.

The lower face of gear 99 is provided with ratchet teeth 101 adapted to engage similar teeth 102 on the upper face of sleeve 103 which is also mounted to rotate freely on shaft 100. Near its center, sleeve 103 carries an integral pulley 104 provided with a V-shaped groove 105. Near its lower end sleeve 103 has a circumferential groove 106 in which is seated an annular flange 107 of a bearing member 108 which is rigidly attached to shaft 100 by cross pin 109, and in which sleeve 103 is rotatably supported.

Shaft 100 has a lower portion 110 of rectangular cross section which is mounted in a housing 111, and is also supported by floor 112 which is supported by cross beam 113 and and divides the fuselage 1 into upper and lower compartments. Shaft 110 is slotted at its lower end to receive a crank 114 which is secured thereto by pin 115. Crank 114 is fixedly mounted upon one end of a shaft 116 which is journalled in supports 117 and 118 and carries fixed on its other end another crank 119 which is in turn connected with pedal shaft 120 which is slidably mounted in floor 112 at a point convenient to the operator's seat 76, and carries at its upper end a pedal 121. Rigidly attached to shaft 110 at a point near its lower end is a bracket arm 122 upon which are rotatably mounted a plurality of pulleys 123 over which pass cords 124. These cords are further supported by a pair of pulleys 125 held by a bracket 126 hung from floor 112 and a second pair of pulleys 127 supported by a bracket 128 mounted upon bearing 108. Cords 124 connect pulley 104 with a control hand wheel 129 rotatably mounted upon a standard 130 which in turn is fastened to floor 112 at a point convenient to operator's seat 76, so that rotation of handwheel 129 rotates pulley 104 and with it sleeve 103. Handwheel 129 is provided with the same form of locking mechanism as hereinafter described for handwheel 147.

When the aviator desires to adjust the pitch of wings 2 and 3, he depresses pedal 121 which raises sleeve 103 until it engages with gear 99 by means of clutch teeth 101 and 102. The aviator then turns handwheel 129 which, by means of cords 124, rotates sleeve 103 and with it gears 99, 98, 97 and 93, which last turns sprocket 91 and through chain 92, also sprocket 90. Sprocket 90, being fixed to shaft 86, it turns same which in turn, through gears 80 and 82, moves sector racks 17 and 19, and through gears 87, 88, 89, 83 and 81, moves sector racks 18 and 20 and varies the pitch and position of wings 2 and 3.

Figure 6:
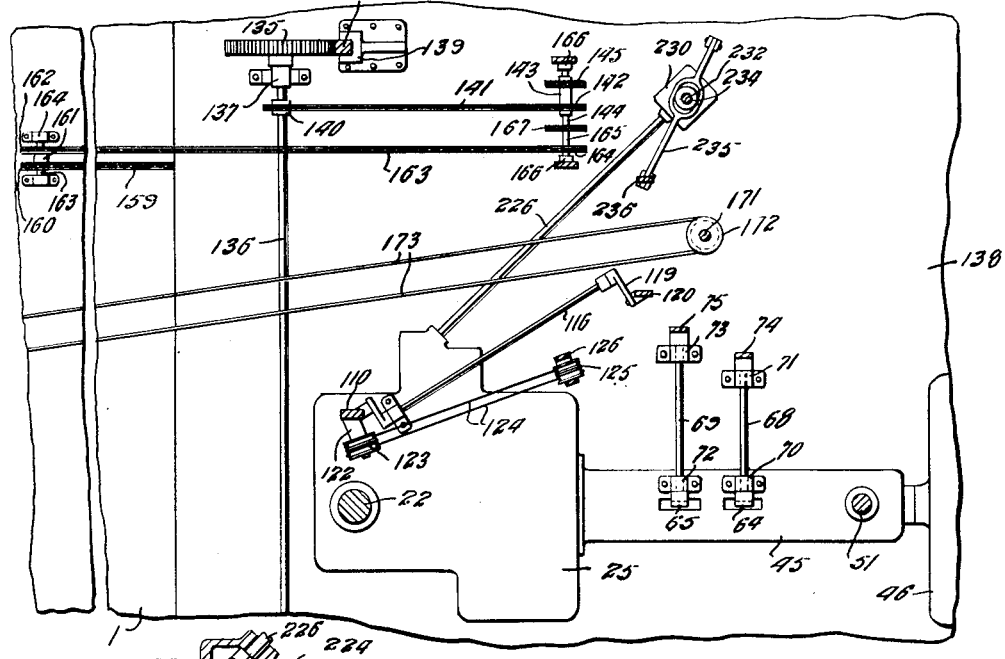
Figure 6 is a plan view of a central portion of the inside of fuselage.

Lower wing 4 is raised and lowered from position for vertical flight (shown in Figure 2) to position for horizontal flight (shown in Figure 3) by a pair of sector racks 131 which are attached to wing 4 by pins 132 and brackets 133. Racks 131 pass through the floor of fuselage 1 and have upon their concave faces teeth 134 engaged by gear wheels 135 which are fixedly mounted upon the ends of a horizontal shaft 136 which is in turn supported by brackets 137 fastened to a platform 138 near the bottom of the fuselage. (See Figures 3 and 6.) Racks 131 are held firmly meshed with gears 135 by heavy brackets 139 which are fastened to platform 138.

Fixedly mounted upon shaft 136 near one end is a sprocket wheel 140 which is connected by a chain 141 to another sprocket wheel 142 mounted upon a sleeve 143 which is in turn rotatably mounted upon a shaft 144 and carries fixed attached to its other end another sprocket 145 connected by a chain 146 to a handwheel 147 supported by a standard 148 at a point convenient to operator's seat 76. To raise or lower wing 4, the operator turns handwheel 147, which by means of chain 146, sprockets 145, 142 and 140 and gears 135, moves racks 131 and raises or lowers wing 4. In order to hold wing 4 in any desired position handwheel 147 is secured against undesired rotation by a conical jam nut 148 which is mounted on axle 149 of handwheel 147 in threaded relation thereto so that wheel screwed down tight against handwheel 147, by small handwheel 150 integral therewith, its conical end 151 enters conical socket 152 in handwheel 147 and locks same against rotation. (See Figure 14.)

In order to adjust the angular pitch of wing 4, there is provided a pair of semicircular racks 153 fixedly attached to wing 4 which have on their convex faces teeth 154 engaging gears 155 fixedly mounted upon a horizontal shaft 156 journalled to the sector racks at 157, part of the lower fuselage being formed to give clearance for the shaft 156.

Shaft 156 carries fixedly attached a sprocket 158 which is connected by chain 159 with sprocket 160 (which is placed at the geometric centre of the sector rack 131) secured to a sleeve 161 which carries another sprocket 162 and is rotatably mounted upon a shaft 163 secured to the fuselage by brackets 164. (See Figure 6.) Sprocket 162 is connected by a chain 163 to sprocket 164 fixed to a shaft 165 which is journalled in bearings 166 and carries another fixed sprocket 167, which is, in turn, connected by a chain 168 to a handwheel 169 mounted upon a bracket 170 attached to standard 148, and provided with the same form of locking mechanism as described for handwheel 147.

In order to vary the angular pitch of wing 4, the operator turns handwheel 169 which, by means of chain 168, sprockets 167, 164, 162, 160 and 158 and gears 155, moves racks 153 and varies the angular position of wing 4. When landing as an airplane wing 4 may be so adjusted as to act as a baffle and check the horizontal travel of the plane over the ground during the landing operation. During the vertical ascension, wing 4 is lowered, and then set vertically as the plane rises, not only to reduce resistance surface but mainly to prevent possible rotation of the fuselage which might be dragged around by the friction of shaft 22.

To control the rudder 7 from operator's seat 76 there is provided a steering wheel 170 mounted upon a vertical post 171 which passes through floor 112 to floor 138 and is journalled in both. Fixed to post 171 just below floor 112 is a pulley 172 over which passes a belt 173 which connects pulley 172 to another pulley 174 fixed to a vertical shaft 175 journalled in walls of fuselage 1, near its rear end. (See Figure 3.)

Rigidly attached to shaft 175 near its midpoint is a gear 176 whose teeth 177 engage similar teeth 178 in a sector rack 179 integral with rudder beam 180 which is rotatably mounted upon a vertical shaft 181 attached to the rear end of fuselage 1. Rudder beam 180 extends through a slot 182 in fuselage 1 and supports vertical fins 183 of rudder 7, and horizontal tail planes 8 which latter are pivotally mounted therein. Rotation of steering wheel 170, rotates rudder 7 about shaft 181, through pulley 172, belt 173, pulley 174, shaft 175, gear 176 and sector rack 179, and steers the helicoplane in horizontal flight. In order to reduce resistance on horizontal tail planes 8 during vertical ascension, they are adapted to be folded down to a vertical position as shown in Figure 2. To accomplish this, horizontal tail planes 8 are attached to rods 184 rotatably mounted on each side of rudder beam 180 in bearings 185. Integral with each rod 184 is an arm 186 to the free end of which is attached a cord 187 which passes under pulleys 188, over pulley 189, and under pulley 190, and is attached to a yoke 191. This yoke is pivoted to the lower end of a lever 192 which is rotatably fixed to floor 112 near operator's seat 76, and provided with a ratchet 193 and pawl 194 to retain it in any desired position.

Figure 3:
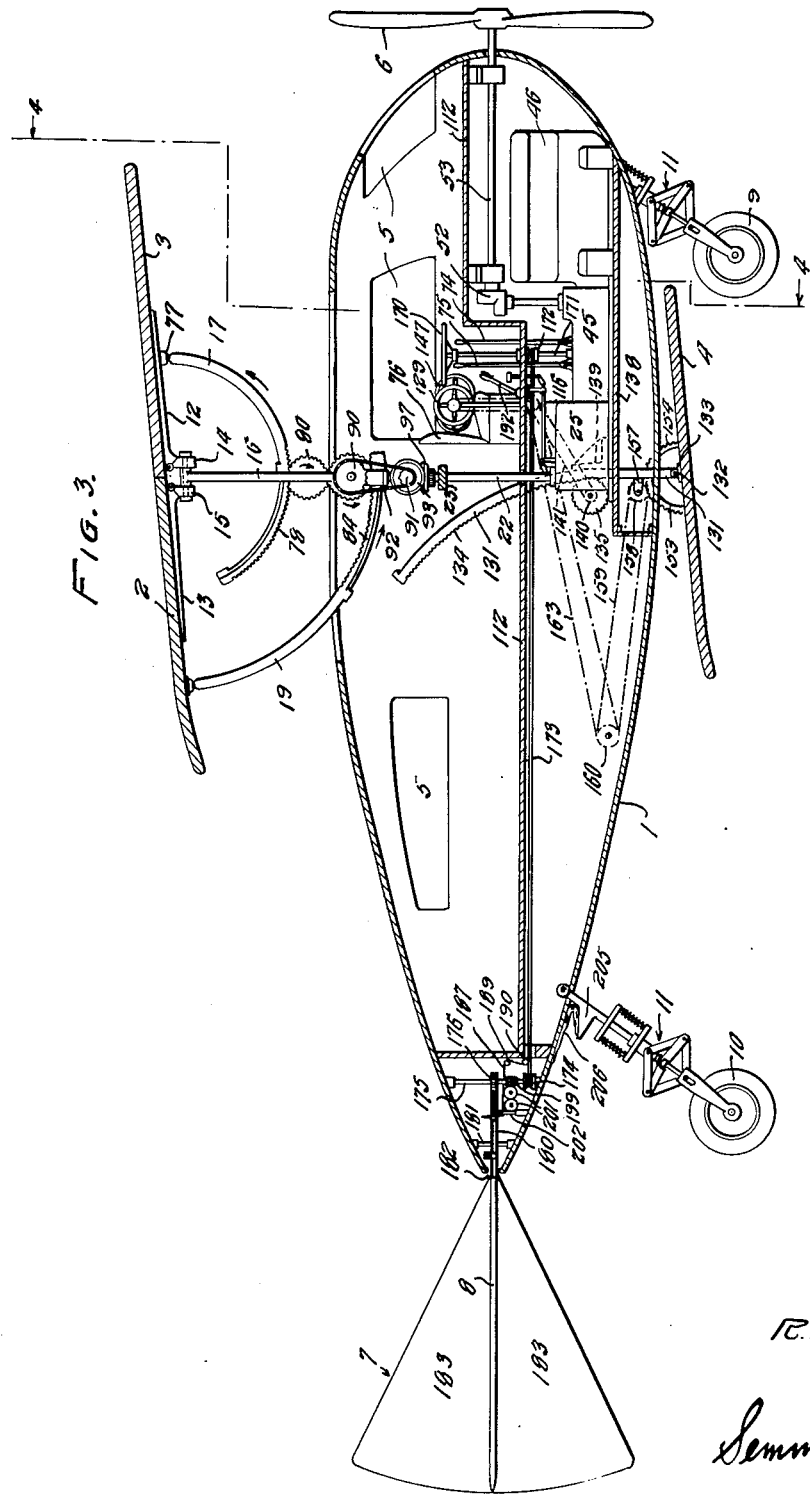
Figure 3 is a longitudinal vertical section of my improved helicoplane showing wings set for horizontal travel.
Figure 4:
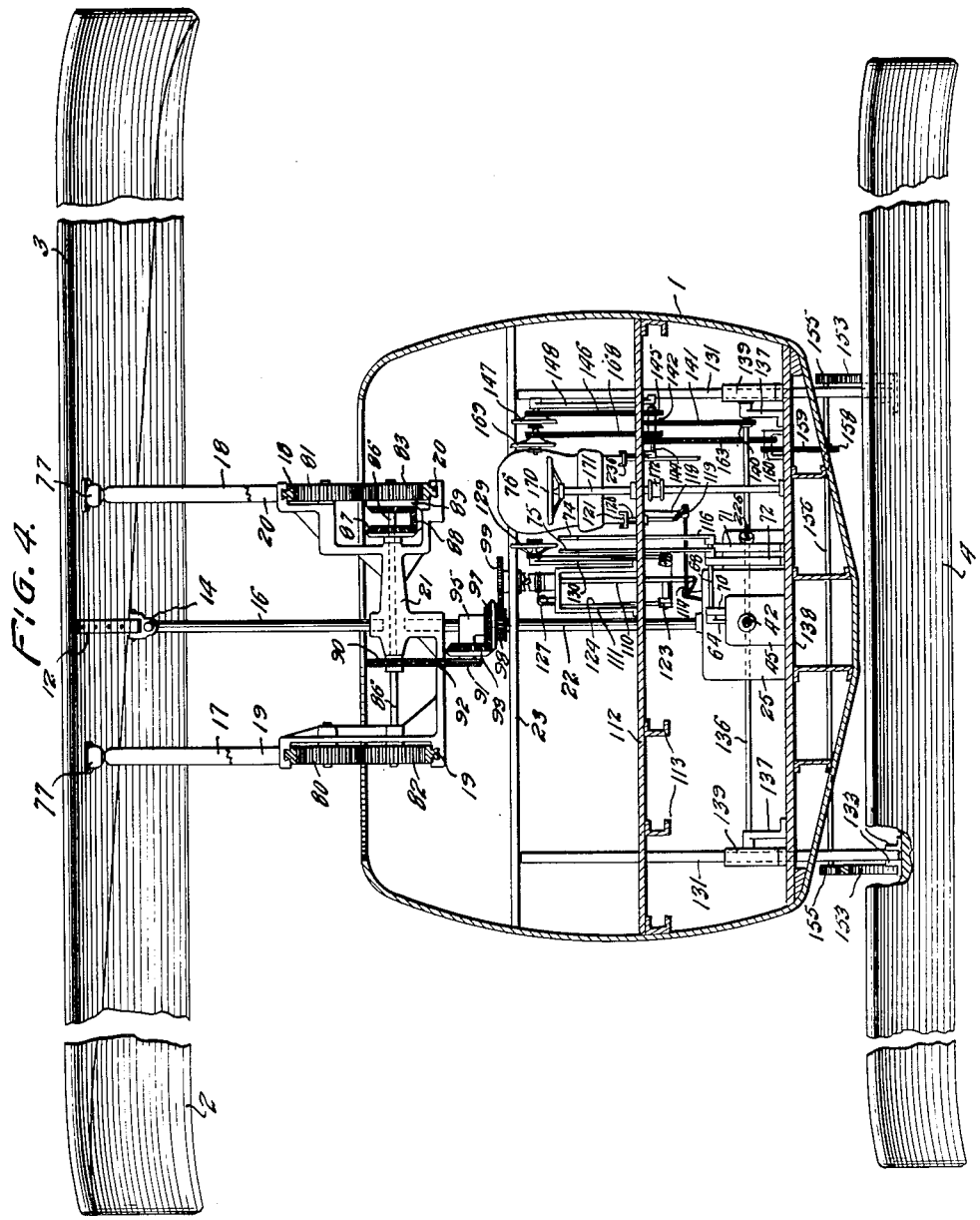
Figure 4 is a transverse section along the line 4—4 of Figure 3.
Figure 5:
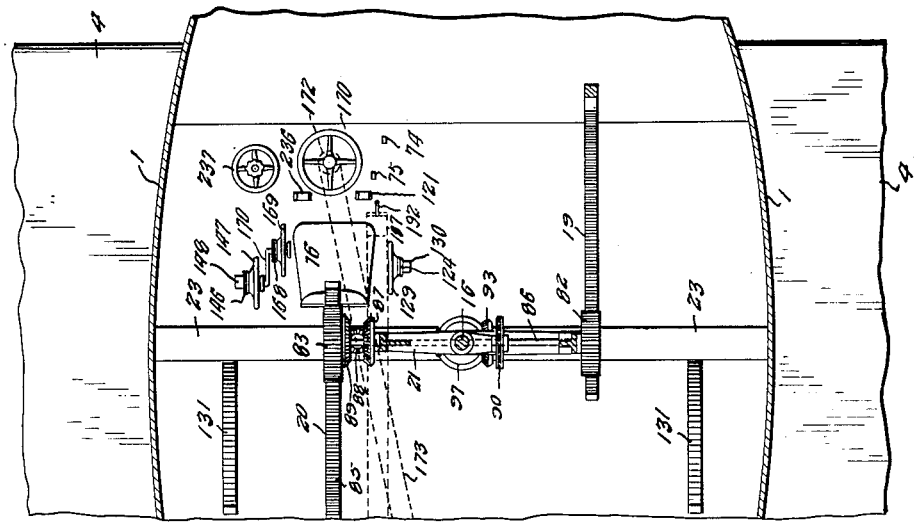
Figure 5 is a fragmentary plan view showing tail operating gear and location of certain controls.
Figure 15:
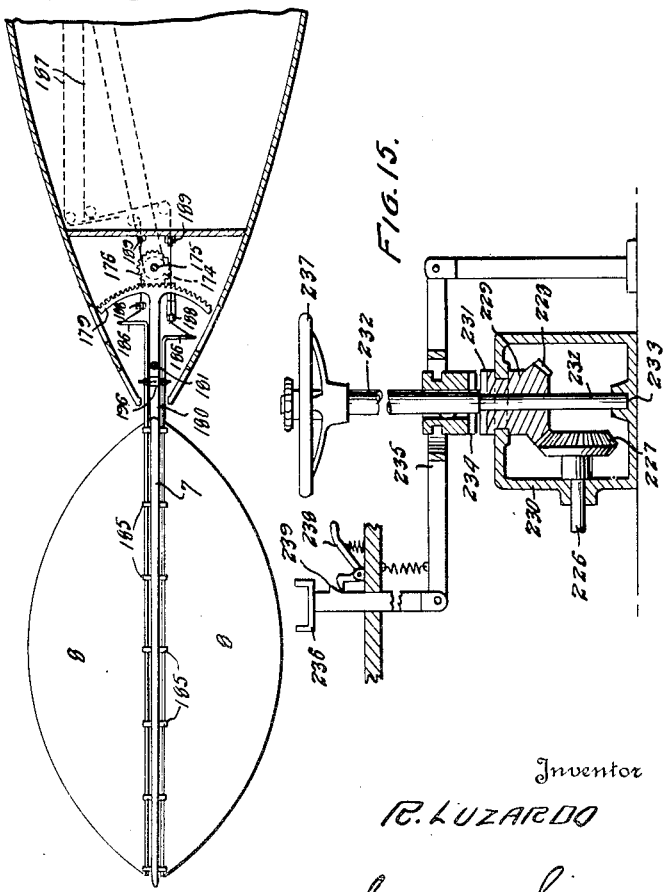
Figure 15 is a vertical transversal section of a part of the wing adjusting mechanism.

Horizontal tail planes 8 are normally maintained in horizontal position shown in Figures 3 and 10, by springs 195 attached at one end to a post 196 integral with rudder beam 180, and at their other ends to lugs 197 integral with arms 198 fixedly mounted on rods 184 opposite post 196, so that springs 195 normally hold arms 198 in contact with post 196, as clearly shown in Figure 10.

To depress horizontal tail planes 8 to their vertical position shown in Figure 2, operator pulls lever 192 to the rear, which through cords 187 pulls down arms 186 which rotate rods 184 and lower planes 8 to vertical position.

In order to avoid depressing planes 8 from their normal horizontal position by rotation of rudder 7 about its axis 181, there is provided a compensating device consisting of a worm 199 fixed to shaft 175, which engages a worm gear 200 mounted upon a horizontal shaft carrying fixed at each end gears 201 which in turn mesh with vertical racks 202 telescopically mounted in standards 203 fixed to the fuselage 1, and carrying at their upper ends pulleys 188. (See Figure 9.) Any rotation of shaft 175 to swing rudder 7 about its axis 181, results in a corresponding simultaneous raising and lowering of pulleys 188, through the worm gear and rack mechanism just described, so that the position of arms 186 (and planes 8) remains unchanged.

In order to facilitate travel along the ground (when desired) and to cushion the shock of landing, wheels 10 are mounted upon resilient mounts 11, each of which consists essentially of an arm 204 pivoted to the under side of fuselage 1 and provided with a bracket stud 205 which limits its rearward movement as shown in Figure 3. A resilient material 206 is inserted between bracket stud 205 and fuselage 1 to cushion the contact therebetween. Fixed to arm 205 is a cross piece 207 in the ends of which are slidably mounted pins 208 surrounded by helical springs 209. Supporting the lower ends of pins 208 and springs 209 are brackets 210 integral with sleeve 211 which is slidably mounted on arm 204 and is supported by a helical spring 210 coiled around arm 204 and resting upon a second sleeve 212 also slidably mounted upon arm 204. Pivotally secured to sleeve 211 are two links 213 which are pivoted at their other ends to similar links 214 also pivoted to wheel frame 215. Also pivoted to the adjacent ends of link 213 and 214 are a third pair of links 216 which are pivoted at their other ends to sleeve 212. A pin 217 rigidly secured to sleeve 212 and frame 215 transmits the motion of one to the other. Near the top of frame 215 is a slot 218 in which travels a pin 219 connecting links 214 together. Integral with frame 215 are fork arms 220, which embrace and support wheel 10. (See Figures 12 and 13.)

Upon contact with the ground, wheel 10 exerts an upward thrust on frame 215 which is transmitted by pin 217 direct to sleeve 212. Sleeve 212 travels up arm 204 compressing spring 210 which exerts a thrust against sleeve 211. At the same time pin 219 which has come to rest against lower end of slot 218 transmits part of the thrust of frame 215 through links 214 and 213 to sleeve 211. At the same time sleeve 211 travels up along arm 204 until brought to rest by the resistance of springs 209. There is thus secured a double cushioning action of the landing shock which greatly lessens the strain on fuselage 1 on landing.

It will be understood that when the operator stops the rotation of the wing members 2 and 3 by manipulation of the lever 75 the wing will not necessarily be in a line at right angles to the body portion of the helicoplane. Such a position is necessary for horizontal flight and to provide for adjusting the wings to this angle there is employed a bevel gear 221 which is splined to shaft 36. Meshing with bevel gear 221 is a bevel gear 222 journalled in a bearing 223 in the transmission housing 25. Integral with the gear 222 is a mitre gear 224 which is adapted to mesh with a mitre gear 225 splined to one end of a horizontal shaft 226.

The opposite end of the shaft 226 carries a bevel gear 227 which meshes with a bevel gear 228. The bevel gear 228 is integral with a sleeve shaft 229 which is provided with an annular groove for the purpose of rotatably journalling it in a housing 230 which is attached to the flooring 138. The sleeve is provided on its upper end with clutch face 231. A vertical shaft 232, the lower end of which is journalled in a step bearing 233 passes upwardly through the sleeve shaft 229 and has slidably keyed thereon a clutch member 234 adapted by means of a yoke 235 to be actuated by a foot pedal 236, to engage the clutch face 231. The extreme upper end of the shaft 233 is provided with a hand wheel 237. When the wings 2 and 3 are disengaged from the transmission and the rotation thereof stops, the pedal 236 is depressed by the operator's foot thereby engaging the clutch members 234 and 231. The hand wheel 237 is then rotated, transmitting power through bevel gears 228 and 227, shaft 226 and bevel gears 225, 224, 222 and 221 to the transmission gearing and thence to shaft 16. A latch member 238 which is adapted to engage a tooth 239 on the foot pedal, is employed to retain the foot pedal 236 down and consequently the clutch members 231 and 234 in engagement. With these latch members in engagement the hand wheel may be locked in a manner illustrated in Figure 14 to prevent rotary movement of the wing sections 2 and 3.

The operation of my improved helicoplane is obvious from the foregoing description of the operation of its several mechanisms.

The operator (aviator) takes his place in seat 76, with top and bottom wings and tail planes 8 set in the position shown in Figures 1 and 2. He starts motor 46, then pushes lever 75 forward engaging main shaft 42 with vertical shafts 22 and 16. This transmits the full force of the motor 46 to wings 2 and 3, and the machine ascends vertically as a helicopter, by the propeller action of the wings 2 and 3.

After a suitable altitude has been reached the operator, by means of handwheel 147 and associated mechanism, raises lower plane 4 to a substantially horizontal position as shown in Figure 3, and then raises tail planes 8 to horizontal position by releasing lever 192. He then restores lever 75 to neutral, pulls lever 74 to the rear, which operations disconnect the engine from wings 2 and 3 and connects it to horizontal propeller 6. He may, if he so desires, connect propeller 6 with the motor and secure some horizontal speed before he disconnects wings 2 and 3 from the motor and loses all vertical speed, by pulling lever 74 to the rear before restoring lever 75 to neutral.

Wings 2 and 3 having come to rest, the operator then depresses pedal 121, which connects handwheel 129 to the upper wing adjusting mechanism, and by rotating wheel 129 he brings wings 2 and 3 into alignment as a single plane in the fixed position shown in Figure 3. Before locking handwheel 129 he insures that wings 2 and 3 are at a true right angle with the longitudinal axis of the fuselage by observing the coincidence of a mark upon shaft 22 with a dial attached to floor 23 (not shown). If wings 2 and 3 are not at right angles to the fuselage, he can make them so by operation of handwheel 237 after wings 2 and 3 have assumed their setting as a single plane as shown in Figure 3. Operator then grasps steering wheel 170 and continues his flight in a horizontal direction.

If he desires to land or descend vertically he simply reverses the above operations and secures vertical travel, whether up or down depending solely upon the speed of rotation of wings 2 and 3.

He may, of course, take off and land, as an ordinary airplane with wings set as shown in Figure 3. This enables him to continue a flight even if his helicopter elements become disarranged and go out of commission.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a helicoplane, a rectangular supporting plane comprising a plurality of substantially triangular sections susceptible of adjustment at varying angles to each other to form a vertical propeller.

2. In a helicoplane, a rectangular supporting wing divided diagonally into a plurality of substantially triangular sections and means to adjust said sections in alignment to function as a supporting wing and to tilt said sections at varying angles to each other to function as a vertical propeller.

3. In a helicoplane, a wing comprising a plurality of sections, each adjustable in two directions to form a vertical propeller.

4. In a helicoplane, a wing comprising a plurality of sections, each tiltable in two directions to form a vertical propeller.

5. In a helicoplane, a wing comprising a plurality of sections, each tiltable and adjustable in two directions to form a vertical propeller.

6. In a helicoplane, a wing comprising a plurality of sections, each adjustable in two directions at right angles to each other to form a vertical propeller.

7. In a helicoplane, a wing comprising a plurality of sections, each tiltable in two directions at right angles to each other to form a vertical propeller.

8. In a helicoplane, a wing comprising a plurality of sections, each tiltable and adjustable in two directions at right angles to each other to form a vertical propeller.

9. In a helicoplane, a full span wing comprising two triangular shaped complementary sections adapted to form a continuous uninterrupted lifting plane in horizontal flight and a vertical propeller in vertical flight.

10. In a helicoplane, a full span wing comprising two complementary sections adjustable to form a continuous uninterrupted lifting plane in horizontal flight and a vertical propeller in vertical flight.

11. In an airplane a rudder and tail planes therefor comprising a rudder beam, a rudder mounted thereon in a vertical plane, a plurality of tail planes pivotally mounted about a horizontal axis on said rudder, means for rotating said rudder about a vertical axis, and means for adjusting the position of said tail planes.

12. In an airplane, a rudder and tail planes therefor, said rudder being mounted in a vertical plane upon a rudder beam, said rudder beam being rotatably mounted about a vertical pivot and provided with an arcuate rack, said tail planes being secured to rods pivotally mounted in a horizontal plane upon said rudder, a pinion engaging said rack, means for rotating said pinion so as to pivot said rudder, and means for pivoting said tail planes about the rudder.

13. In an airplane, a rudder and tail planes therefor comprising a rudder beam adapted to rotate about a vertical axis, said rudder being mounted upon said beam, bearings formed upon each side of said rudder, rods rotatably mounted in said bearings, said tail planes being secured to said rods so as to rotate about a horizontal axis, means for adjusting the position of said rudder, means for adjusting the position of said tail planes with respect thereto and means for normally maintaining the tail planes in a horizontal position when the rudder is rotated about its axis.

14. In a helicoplane a rectangular supporting plane comprising a plurality of substantially triangular sections susceptible of adjustment at varying angles to each other to form a vertical propeller and means for rotating said sections when so positioned.

15. In a helicoplane a rectangular supporting plane comprising a plurality of substantially triangular sections, each of said sections being pivotally connected to a vertical shaft so that they may be moved in any direction with respect thereto, a plurality of sector racks pivotally connected with each section, means for operating said racks so as to adjust the angular position of the sections with respect to each other, and means for rotating said shaft and sections.

16. In a helicoplane a rectangular supporting plane comprising a plurality of substantially triangular sections, each of said sections being pivotally connected to a vertical shaft so that they may be moved in any direction with respect thereto, said shaft adapted to be rotated by a power source mounted on said helicoplane a plurality of sector racks pivotally connected with each section, pinions associated therewith, means for actuating said pinions so as to position said sections in angular relation with respect to each other, means for locking said sections in adjusted position and means for positioning and locking said supporting plane at right angles to the longitudinal axis of a fuselage with which it is associated.

17. A helicoplane comprising a fuselage, an upper rectangular supporting plane having a plurality of substantially triangular sections susceptible of adjustment at varying angles to each other to form a vertical propeller, and a lower supporting plane adapted to be raised and lowered with respect to said fuselage.

18. A helicoplane comprising a fuselage, an upper rectangular supporting plane having a plurality of substantially triangular sections susceptible of adjustment at varying angles to each other to form a vertical propeller, and a lower supporting plane adapted to be tilted about a horizontal axis extending the length of the plane and to be raised and lowered with respect to said fuselage.

19. A helicoplane comprising a fuselage, an upper rectangular supporting plane having a plurality of substantially triangular sections susceptible of adjustment at varying angles to each other, means for adjusting said sections to form a propeller for vertical flight and to form a continuous uninterrupted supporting plane for horizontal flight, and a lower supporting plane associated with the helicoplane, said lower plane adapted to be tilted about a horizontal axis so as to form a baffle to prevent rotation of said fuselage during vertical flight and to form a horizontal supporting plane during horizontal flight.

In testimony whereof I affix my signature.

RUDOLPH LUZARDO.